United States Patent [19]
Di Stefano et al.

[11] Patent Number: 4,613,966
[45] Date of Patent: Sep. 23, 1986

[54] SEALED ENCAPSULATION FOR FLOPPY DISK USING CENTRIFUGAL FORCE TO FLATTEN DISK

[75] Inventors: Thomas H. Di Stefano, Bronxville; Robert Sadofsky, Hopewell Junction, both of N.Y.

[73] Assignee: International Business Machines Corporation, Armonk, N.Y.

[21] Appl. No.: 509,741

[22] Filed: Jun. 30, 1983

[51] Int. Cl.4 ..................... G11B 23/033; G11B 17/32
[52] U.S. Cl. .................................... 369/100; 346/137; 369/291; 369/284; 369/286; 369/287
[58] Field of Search ............... 369/111, 100, 115, 275, 369/282-284, 286-287, 270, 261, 280, 274, 272, 214, 180, 291, 77.2; 358/342; 346/137, 135.1; 360/132, 133, 102, 103, 97-99, 135

[56] References Cited
U.S. PATENT DOCUMENTS

| 4,074,282 | 2/1978 | Balas, Jr. et al. | 369/275 X |
| 4,159,494 | 6/1979 | Evans et al. | 360/133 |
| 4,331,966 | 5/1982 | Moe | 369/284 X |
| 4,365,258 | 12/1982 | Geyer et al. | 358/342 X |
| 4,379,507 | 4/1983 | Llabres | 346/137 X |

Primary Examiner—Raymond F. Cardillo
Assistant Examiner—Robert A. Weinhardt
Attorney, Agent, or Firm—Jackson E. Stanland

[57] ABSTRACT

An optical floppy disk system is described in which the optical disk is enclosed in a flexible housing which is optically transparent. Both the optical disk and its protective housing can be made at very low cost from inexpensive materials. The disk is enclosed within the protective housing and the housing and disk rotate as a unit during operation. The protective housing does not adversely affect the optics of the system.

10 Claims, 10 Drawing Figures

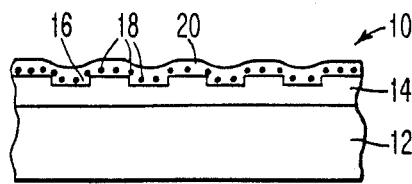
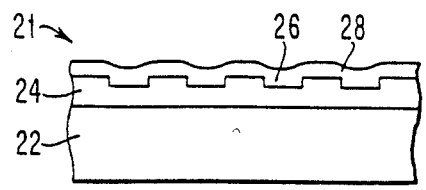
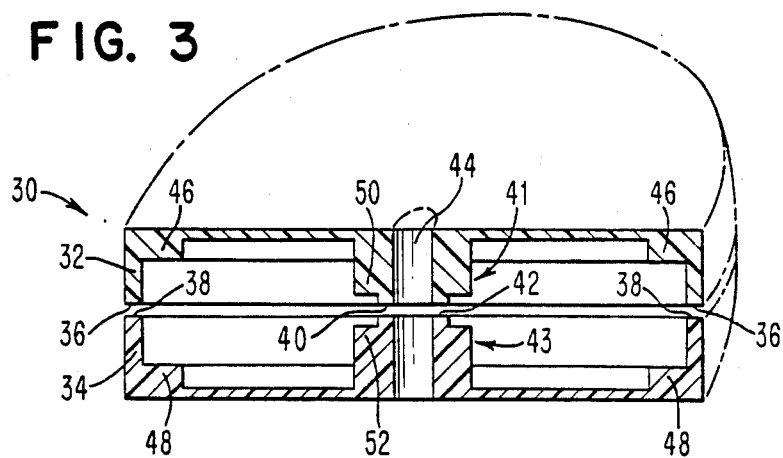
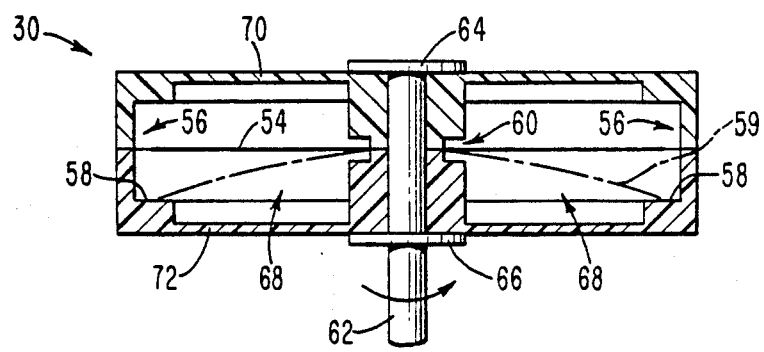

SEALED ENCAPSULATION FOR FLOPPY DISK USING CENTRIFUGAL FORCE TO FLATTEN DISK

DESCRIPTION

1. Technical Field

This invention relates to floppy optical disks, and more particularly to an encapsulated floppy optical disk where the encapsulation includes a low-cost flexible, optically transparent housing which rotates with the floppy disk during recording and reading, and which does not adversely affect the optics used to record on and read from the optical disk.

2. Background Art

Various types of optically readable disks are well known in the art, and include both rigid disks and flexible, or floppy, disks. These optical, or video, disks generally include a storage or information bearing layer in which the reflectivity or another optical property of the material differs in accordance with the information to be stored. For example, an opening can be made in the optical storage medium to produce a localized area having different reflectivity than the surrounding areas of the storage medium. When an optical beam, such as that produced by a laser, intercepts the opening, it will be reflected in a different manner than will the optical beam when it strikes an area of the storage medium not including the opening.

Optical disks for the storage of information are well known in the art, and are generally described in the May/June issue of *High Technology*, on pages 60–67. Another article of interest which describes many of the materials used for the storage medium and the configuration of the disk itself is an article found on pages 47–52 of the August, 1981 issue of *Laser Focus*. As is apparent from this article, the different types of storage media can include, among other possibilities, thin metal films, organic dyes, metal-impregnated polymers, photographic film, photochromics, etc.

In optical recording, the optical disk should be protected against adverse environmental conditions, such as dust and other particles which may interfere with the recording and reading of information on the disk. For a rigid optical disk, thick optically transparent coating layers have been used. If the coating layer is sufficiently thick, dust or debris on the surface of the coating layer will be out of focus to the read optical beam, and will therefore not interfere with reading of information on the optical disk. Such coatings also eliminate the need for special precautions when handling the disk. These overcoating layers help to prevent problems of oxidation of the storage layer of the disk and attack by other chemical agents.

Another approach used to protect optical disks is the use of some type of dust cover, or cartridge in which the disk is contained. Examples of rigid encapsulation or dust covers are found in U.S. Pat. Nos. 4,106,057; 4,331,966, and 4,340,959. Cartridge-type approaches for enclosing a video disk are illustrated in U.S. Pat. Nos. 4,159,494 and 4,320,833. Another type of snap-fit video disk package is illustrated by U.S. Pat. No. 4,084,691.

The dust covers or protective cartridges exemplified by the prior art are not intended to rotate with the disk during the use of the disk for either recording or reading. This is particularly true in the case of floppy optical disks, where the rotation of the disk is used to provide self-leveling.

U.S. Pat. Nos. 3,980,810 and 4,069,508 describe the use of air bearings on which floppy disks rotate. While the latter of these patents describes various housings for the disk, the disk is free to rotate within the housings.

While most manufacturers seem to agree that the optical disk must be protected to prevent the problems of dust, scratches, oxidation, and chemical attack, the optimum manner in achieving this protection is not clear. This is especially so in the case of floppy optical disks, where cost is a primary concern. In such disk systems, protective coatings have been utilized. But these protective coatings tend to impair the flexibility, or floppiness, of the disk. If the coating is thick enough that dust and other imperfections are out of the focal plane of the reading optical beam, the disk becomes relatively rigid. In turn, this will mean that it will not perfectly self-level during rotation. In turn, the optical reading beam will not be in focus at all points along the optical disk.

Another problem with the use of protective coatings on flexible disks relates to costs. It is important to make the floppy disks as inexpensive as possible and to also provide inexpensive protection for these disks. It is very difficult to produce thick enough protective coatings on a floppy disk, and certainly almost impossible to coat such disks from a solvent. In one known approach, two layers of coating are laminated together and pressed onto the floppy disk. However, imperfections are created by this technique, and the resulting rigid disk is likely to warp as it ages.

When the protective coating is made as thick as possible to remove dust and scratches from the focal plane of the optical reading beam, the floppiness of the disk is impaired and it will not adequately self-level when it is rotated. While some imperfections of this type can be compensated by optical servo-techniques, the costs of such sensitive systems is great and some imperfections cannot be optically compensated.

It is therefore an object of this invention to provide an optical floppy disk including a protective housing therefor, where the optical floppy disk can be made at extremely low cost and still be optically adequate.

It is another object of the present invention to provide a protective means for an optical floppy disk which totally encloses the disk and which does not affect the optical system used to read information on the optical disk.

It is a further object of the present invention to provide an optical floppy disk and an encapsulation means for the disk which is flexible and can distort without altering the optics used to record and read information from the disk.

It is a still further object of the present invention to provide an optical floppy disk and a protective housing for such disks, which attaches to the floppy disk and rotates with it during writing and reading operations.

It is another object of the present invention to provide an extremely low cost optical floppy disk system including a floppy disk which is susceptible to excellent self-leveling when rotated, and an extremely low cost protective housing for the floppy disk which can be distorted without adversely affecting the optics of the system, and which does not impair self-leveling of the floppy disk during rotation.

DISCLOSURE OF INVENTION

In its broadest sense, the present invention is directed to an optical floppy disk-encapsulation system which is manufacturable at an extremely low cost. The optical floppy disk can be of any type, and is typically made in a manner to insure that it is of low cost and extremely flexibility. During its manufacture, grooves defining tracks are impressed in it. Any type of floppy optical disk can be used in the practice of this invention.

The floppy optical disk is protected by encapsulation means, where the encapsulation means is a housing that is optically transparent and is designed to hold the optical floppy disk and rotate with it during recording and reading of the information on the floppy disk. The housing is generally of annnular shape and is made of inexpensive material such as PMMA (polymethyl methocrylate), which is optically transparent. Even though the housing can be thin and distort and warp, it won't significantly affect the focus of the transmitted optical beam onto the floppy disk. Also, the inner and outer surfaces of the housing through which the optical beam passes are out of focus to the optical beam and therefore do not interfere with the writing or reading operations. This also means that dust, scratches, etc. on both surfaces of the protective housing will also be out of focus to the optical beam and will not interfere with the recording or reading operations.

Generally, the housing is comprised of at least two sections (such as top and bottom sections) which fit together to securely hold the disk and to substantially or completely enclose (surround) the disk. The fitted sections can, in one embodiment, define an annular structure having an axial opening in it which passes through the centers of the housing and the secured disk. In that embodiment, peripheral support means (such as a thicker portion) is provided to make the outside diameter of the housing more rigid, so as not to impair the motion of the disk. This housing also includes central support means for giving rigidity to the central hub section of the housing, which holds the disk at its inner diameter.

Since the optical floppy disk is enclosed within and moves as a single unit with its encapsulation means, the surface of the optical floppy disk will not experience air currents which could distort it or carry imperfections to it. Also, since the optical floppy disk can be sealed within the encapsulation means during the manufacturing process, all manufacturing can be done in a clean room in order to insure the cleanliness of the optical disk. Still further, this disk does not need to have excessive layers of protective coating thereon, and can therefore be extremely floppy. This means that the amount of self-leveling which occurs during rotation of the disk will be great and this in turn will insure that the floppy disk stays at the focal point of the optical beam. Since the self-leveling of the floppy disk will be enhanced, and since the housing will not adversely disturb the optics of the system, increased reliability should result without undue complexity or cost.

These and other objects, features and advantages will be apparent from the following more particular description of the preferred embodiments.

BRIEF DESCRIPTION OF THE DRAWINGS

FIGS. 1 and 2 represent two types of optical floppy disks which can be used with the present invention. These are merely chosen as examples of floppy optical disks, where it is understood that any type of floppy optical disk can be used in the present invention.

FIG. 3 is a side sectional view of the encapsulation means for enclosing a floppy optical disk, being comprised of a top section and a bottom section which are joined together. The phantom lines in this drawing represent the round shape of the encapsulation means, this shape being chosen to accomodate an optical disk.

FIG. 4 is a sectional view through the mid-section of the encapsulation means, and shows how the floppy disk is held in the encapsulation means, which then is rotated as a unit by the driving spindle.

BEST MODE FOR CARRYING OUT THE INVENTION

Figure 5:
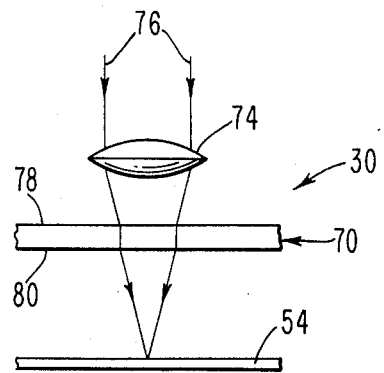
FIGS. 5, 6, and 7 show portions of the encapsulation means and the floppy optical disk, and more particularly illustrate how the encapsulation means can be distorted or warped, without substantially impairing the focus of the optical beam upon the floppy disk.

This invention is directed to a floppy optical disk and an encapsulation means therefor, which protects the disk and rotates along with it. Both the disk and the encapsulation means can be made at extremely low cost.

FIGS. 1 and 2 show two optical video disks known in the art, and represent examples of the floppy optical disks that can be protected with the present encapsulation means. In FIG. 1, the disk 10 is comprised of a substrate 12, made of a material such as PET (polyethylene terephthalate), a commercially available sample of which is Mylar TM (a trademark of E. I. du Pont De Nemours) on which is a layer 14 of leveling material. The PET substrate is generally 1-3 mils in thickness, while the leveling layer 14 is approximately 1-10 micrometers. A suitable leveling layer is PMMA (polymethyl methyocrylate) which is solvent or miniscus coated onto the substrate 12. Since the PET surface may have imperfections in it, the leveling layer 14 is used to provide a smooth surface.

Layer 14 has grooves 16 therein which are the tracks used for recording. These tracks are typically about 500-3000 Å deep and are produced during the manufacture of the video disk 10, as will be explained more fully with respect to FIG. 8. In disk 10, metallic particles 18, such as gold particles, are interspersed in a thin layer. Metal particles 18 can be flash-coated to a thickness of about 50 Å onto the leveling layer 14, after which they are overcoated with a thin polymer layer 20. Polymer layer 20 serves as a thin protective layer for the metal particles 18.

The optical floppy disk 21 of FIG. 2 also includes a substrate 22 and a leveling layer 24, into which grooves 26, or tracks, are made. The information bearing layer 28 is a dye in this embodiment, which is deposited by solvent coating to a depth of 1000-2000 Å, typically. This dye can be an infrared absorbing dye recording medium such as hydroxy-squarylium dye. The use of such a dye in an optical disk is described on page 50 of the above-cited *Laser Focus* article.

The floppy optical disks of FIGS. 1 and 2 are merely representative of the types of optical disks which can be used in the present invention. This invention encompasses the use of flexible optical disks, and more particularly floppy optical disks, where the disk can be made very cheaply and without unduly thick protective layers. Protection of the disk is primarily due to the encapsulation means, which is designed to rotate as a unit with the disk which is enclosed therein.

FIG. 3 shows a cross sectional view of the encapsulation means at its center, and also indicates the overall annular shape of this embodiment of a suitable encapsulation means. In this FIG., the encapsulation means 30 is comprised of a top portion 32 and a bottom portion 34, which can be joined together to make a unified structure. Encapsulation means 30 is an annular, optically transparent housing which is flexible and of low cost. For example, it can be fabricated of materials such as PMMA or polycarbonate. This material should have low cost and sufficient optical properties that it will be transparent to the wavelength used and at the same time will be light and durable. The optical properties of the material should be relatively isotropic and not exhibit birefringence. It must also be durable against grazing, opacity, yellowing, and light scattering.

The annular housing 30 is a flexible housing which holds the optical disk securely, but is sufficiently thin that it is subject to distortion when the housing and the disk are rotated. When top and bottom portions 32 and 34 are joined together, peripheral edges 36 and 38 will be in contact with one another. Also, the edges 40 and 42 of the central hub will be in contact. However, top and bottom hub portions 41, 43 are designed to grasp the floppy disk in order to hold it at its inner diameter. If the floppy disk were not present, hub edges 40 and 42 would contact one another when the top 32 and bottom 34 of the housing 30 are brought together.

An axial opening 44 is provided through both portions 41, 43 of the central hub to accomodate a drive spindle for movement of the housing and its contained optical floppy disk.

The peripheral shoulders 46 and 48 give some strength and rigidity to the periphery of the housing 30 and define the peripheral support means. Further, the central hub shoulders 50 and 52 give strength to the interior of the housing 30, and provide mechanically durable surfaces for adequately holding a floppy disk in the housing 30. Hub portions 41 and 43 generally define the central support means.

FIG. 4 shows the housing 30, having an optical floppy disk 54 contained therein. Disk 54 is held at its inside diameter by the hub portions 41 and 43, and more particularly is pressed against the edges 40 and 42. The size of the area of contact with the floppy disk 54 is not critical, and generally a one quarter inch band of contact is sufficient to hold the disk.

A peripheral groove 56 is provided to allow sufficient room for the floppy disk to flatten during rotation. At the same time, the disk will rest on the ledge 58 when no rotation is imparted to the combination of the housing 30 and the disk 54. The rest position of the floppy disk is indicated by the dashed lines 59.

A small groove 60 is located around the joined hub portions 41, 43 of the housing 30. Groove 60 is just wide enough to provide a bearing surface for the movement of the disk together with the housing 30.

A spindle 62 can be used to impart rotational motion to both the housing 30 and the secured disk 54. For this purpose, collars 64 and 66 are provided to securely hold the center of the housing 30 and the disk 54. Spindle 62 fits into axial opening 44 (FIG. 3) for this purpose.

The top and bottom portions 32 and 34 of housing 30 can be held together by a friction fit due to the collars 64 and 66. As an alternative, these two portions can be glued together or a UV curable polymer can be used to bind them. This polymer would be coated on the mating surfaces 36 and 38 before the surfaces are pressed together. If UV light is then directed onto the UV curable polymer, the polymer will be cured and will seal together the top and bottom portions of the housing.

The cavity 68 in the hollow housing 30 can be evacuated or filled with a gas. However, if both the floppy disk 54 and the housing 30 are fabricated in "clean" rooms of the type well known in manufacturing, dust and foreign matter will not collect in an amount sufficient to cause a problem.

The thicknesses of the top and bottom walls 70 and 72, respectively, through which light passes for recording on the floppy disk 54 and for reading information from the disk have a thickness which does not substantially impair the passage of light therethrough. Generally, the thicknesses of these walls are about 0.5 –1.5 mm. Because the housing 30 can distort without impairing the optical beam, these walls 70, 72 can be made very thin.

The top and bottom walls or edges 70 and 72 are also chosen to be at a distance from the optical disk 54 that no interference with the optics will be caused. Both the outside surface and the inside surface of top edge 70 and bottom edge 72 are out of focus with the optical beam used to write and read on the floppy disk 54. Generally, this means that these edges are about 400 micrometers or more from the floppy disk, during rotation of the disk and housing. This means that any dust or stratches on the edges 70 and 72 will not interfere with the optics of the system. As will be seen more particularly with respect to FIGS. 5–7, distortions, etc. of the housing 30 will not interfere with the optics of the system. Thus, housing 30 need not be optically perfect, since its warpage and distortion will not adversely affect calibration of the optical system and inexpensive materials can be used for the housing and the disk.

To at least a first order, imperfectiqns in the housing, including warpage and distortion thereof, do not affect the optical system. The only effect on the point of focus of the optical beam will be the floppy disk itself. However, maximum self-leveling can be obtained, since the floppy disk can be made of thin inexpensive materials which give greater floppiness. Also, thick protective coatings are not required because the disk is within the housing, or envelope 30. The net result is that the flatness of the disk itself becomes the primary determinent in the precision of focus of the optical beam onto the disk and, since maximum flatness can be achieved, better reliability will be obtained.

In the practice of this invention, it will be appreciated by those of skill in the art that a double sided floppy disk can be used in which information is stored on both surfaces of the disk. Optical beams can be directed through either the top edge 70 and the bottom edge 72 of the housing 30 in order to read both sides of the floppy disk. Still further, it will be appreciated by those of skill in the art that two floppy disks can be contained within this housing, where the information layer on each floppy disk would face the outside of the housing. In this manner, the information on the disks would be accessible by optical beams directed through top wall 70 and bottom wall 72.

Figure 6:
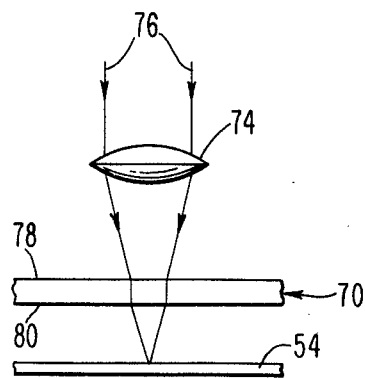
Figure 7:
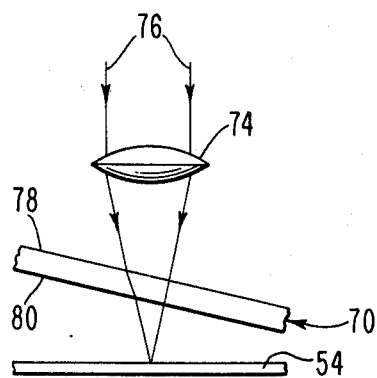

FIGS. 5–7 illustrate how the optical beam is unaffected by the housing 30, at least to a first order. In these FIGS. the same reference numerals will be used whenever possible for ease of corrolating these FIGS. with FIGS. 3 and 4.

In FIG. 5, a lens 74 directs an optical beam, indicated by the arrows 76, to a focus on the information bearing surface of optical disk 54. Beam 76 passes through housing 30 before striking the disk 54. A portion of the top wall 70 of the housing is shown in this FIG. Both the outside surface 78 and the inside surface 80 of wall 70 are sufficiently far away from the floppy disk 54 that they are out of focus with the optical beam. This means that any dust, scratches, and other imperfections on surfaces 78 and 80 will not adversely affect the focal point of the beam 76 on the disk 54.

In the design of the optical system, the system is corrected for the index of refraction of the housing 30 and for the thickness of top and bottom walls 70 and 72. Once this correction is made, further distortions of the flexible housing 30 will not affect the focal point of the optical beam onto the floppy disk.

While FIG. 5 shows the housing 30 and the disk in their usual configuration when both the disk and the housing are in rotation, FIGS. 6 and 7 indicate examples of distortion and warpage which can occur to the housing 30. As is apparent from these drawings, the focal point of the optical beam is still on the top surface of the disk 54. In the example of FIG. 6, top wall 70 of the housing is distorted to be closer to the disk 54 then it is in FIG. 5. However, the distance between wall 70 and disk 54 is still sufficiently great that surfaces 78 and 80 remain out of focus with the optical beam.

In FIG. 7, top wall 70 is warped. However, the focus of the optical beam 76 is still onto the top surface of disk 54.

To a first order, displacement or twisting of the protective housing 30 will not change the focus of the beam, nor will it cause change of direction of the retro-reflected light. Only if the housing 30 is twisted to a great extent so that the apparent thickness of the wall 70 is increased significantly, will there be any possible change in the focus of the optical beam. However, a great amount of twisting is required for this to happen.

FIGS. 8–10

Figure 8:
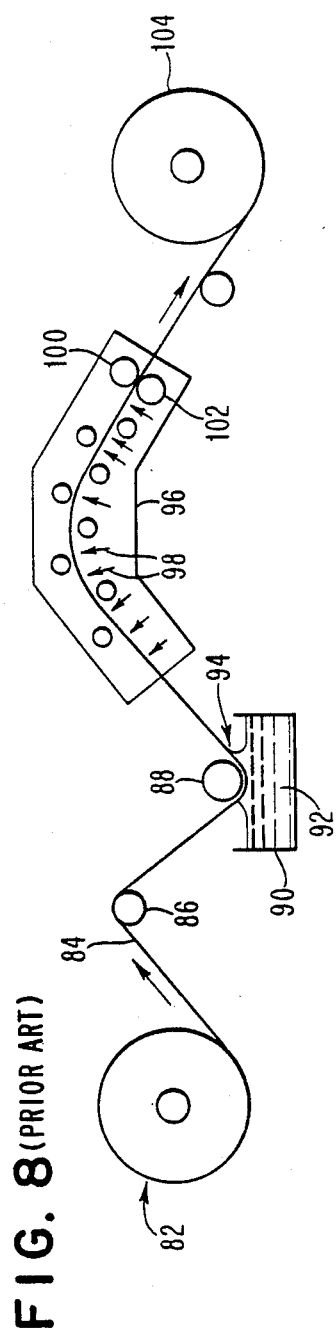
FIG. 8 shows a typical apparatus of the type which can be used to put grooves, or tracks, on the floppy optical disk during manufacture.
Figure 10:
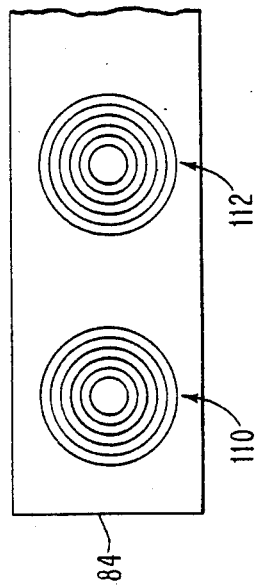
FIG. 10 shows a portion of the web which is produced by the apparatus of FIG. 8, having two sets of concentric grooves therein which form the basis of two floppy optical disks.
Figure 9:
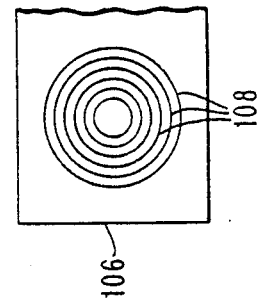
FIG. 9 shows a portion of the metallic roll which is used to calendar the floppy disk during manufacture in order to create grooves, or tracks, therein.

In the manufacture of these floppy disks, the disk can have grooves, or tracks, produced in it before it is sealed in the housing 30. After being sealed in housing 30, the final laser writing operation will be undertaken in which information is written into the storage layer of the disk. FIGS. 8–10 illustrate how the disk can be made.

Since the disk is to be sealed into the protective envelope 30, it should have the track and sector information printed directly on its surface during manufacture. A very inexpensive way to do this is illustrated by the apparatus by FIG. 8, which schematically illustrates the technique of meniscus coating onto a moving web, which is a technique well known in the art. A supply reel 82 contains the floppy disk substrate, which is typically a plastic such as PET. A moving web 84 of the substrate passes over rollers 86 and 88, and dips into the tank 90. Tank 90 contains a leveling liquid which is to be meniscus-coated onto the outer surface of web 84. This leveling layer is used to provide a flat surface over the substrate, which is often quite rough. A suitable material 92 for the leveling, or smoothing, layer is PMMA. As web 84 leaves tank 90, a meniscus will be drawn therefrom at location 94. This will provide a thin coating of the smoothing layer onto the web, which then moves into a large air drying box 96. The arrows 98 indicate the direction of warm air flow onto the web in order to dry the smoothing layer.

Prior to complete drying of the smoothing layer, grooves are impressed in it corresponding to the tracks used for servo-information and the tracks used for later recording of information onto the disk. These tracks are often spiral or concentric tracks and are produced by the calendar rollers 100 and 102, through which a moving web 84 passes. Calendar roller 102 has a die on its outer surface which presses against the smoothing layer in order to make grooves in the smoothing layer. These grooves harden and the web 84 is then loaded onto a take-up roll 104.

Calendar rolling is well known in the art, and FIG. 9 illustrates a type of die which can be used to make the grooves, or tracks, in the smoothing layer. Die 106 is a thin metal film which is rolled around roller 102. Metals such as Cr and Ni can be used. Die 106 has raised portions 108 arranged in concentric circles thereon. These raised portions press into the smoothing layer on the moving web 84 and produce concentric grooves in the smoothing layer corresponding to the raised portions 108. The result of this calendaring operation is shown in FIG. 10. In this FIG., the web 84 which exits from drying chamber 96 has sets 110, 112, etc., of concentric grooves impressed into the smoothing layer along the length of web 84.

After the web is loaded onto the take-up roll 104, it is put into another coating processor to apply the storage medium. The process for coating the storage medium is dependent upon the type of storage medium. For example, infrared absorbing dyes can be solvent-coated onto the web 84, while metal particles, such as gold (FIG. 1) are flash-coated in a vacuum system onto the smoothing layer of the web 84. If a metallic layer is used, a thin polymer overcoating layer of approximately 200 angstroms is also applied in the same glow discharge vacuum system. After this, the individual disks can be stamped out of the web 84.

Since the smoothing layer has grooves in it, the storage layer will also have grooves in it, which will serve as the storage tracks when information is written into the optical disk.

In order to encapsulate the optical disk, the disks are stamped from the finished web 84 and are sealed in the protective housings 30. An optical beam is then used to write information in the tracks of the floppy disk. The floppy disks remain in their respective protective housings during this write operation and during any subsequent handling steps. This provides complete protection of them.

As an alternative technique to the use of calendaring to produce tracks in the leveling layer, the leveling layer can be etched by irradiation with a beam of ultraviolet light of wavelengths less than 200 nm. Such light will etch the polymer smoothing layer in a pattern dependent upon the patterned followed by the beam of ultraviolet light. In this manner, grooves can be traced in concentric circles or in spirals on the smoothing layer to create the tracks therein. Since this technique, known as ablative photodecomposition, will work even if the smoothing layer is hardened, it can be effected after the web leaves the box 96.

In the practice of this invention, the floppy disk is maintained in a flat position by centrifugal force when the disk and its protective housing are rotated. When the disk is at rest, the outer shoulders 48 prevent it from rubbing against the bottom of the housing. If desired, the bottom of the disk can be coated with an antistatic material. During the life of the floppy disk, this housing, or encapsulation, may warp and distort but the floppy disk will remain flat when the disk is rotating at speed. This flatness will continue up to the time when the floppy disk supports along the outside diameter of the housing 30 become sufficiently distorted that they begin to touch the surface of the floppy disk during rotation. When this occurs the entire housing-disk combination can be discarded, or the disk can be put into another similar housing.

The housing can be produced by commercially available processes, such as low cost molding of optically transparent plastics, such as PMMA. The type of mechanism for holding the floppy disk and for providing the peripheral supports of the housing can be changed without departing from the spirit and scope of the invention. For example, the housing can be clamped at its center, along the top and bottom surfaces of the housing, rather than be driven by a spindle extending through an axial opening. While distortion etc. of the encapsulation means will not affect the disk and the optics of the system, the encapsulation means usually includes means to strengthen its periphery and central portions to insure that the disk will rotate in a flat plane. Thus, while the invention has been shown with respect to selected embodiments thereof, it will be further appreciated that variations in form and design can be made without departing from the spirit and scope of the present invention.

What is claimed is:

1. In combination, a floppy optical disk and a sealed protective housing for said disk through which an optical beam from an optical system can pass for writing information onto said disk and reading information from said disk, said protective housing comprising in combination:

first and second sections adapted to be brought together in a substantially air-tight seal to securely hold said floppy optical disk therebetween and to create a hollow space in which said floppy disk can flatten by centrifugal force when said floppy disk and said housing are rotated as a single unit, there being no relative motion between said disk and said protective housing during their rotation, said first and second sections being comprised of a material which is optically transparent to said optical beam and being sufficiently thin and flexible that said first and second sections can distort when being rotated, said first and second sections together forming a structure having a central hub portion to which a drive mechanism can be fastened for rotating as a single unit said housing and said secured floppy disk, said central hub portion holding said disk at its inner diameter, the outer diameter of said disk being unsecured and out of contact with said sections during rotation of said housing and disk, there being peripheral support means at the periphery of said housing for increasing the rigidity of the periphery of said housing, and central support means for giving rigidity to the central hub of said housing and for holding said floppy disk, and wherein the surface of said housing through which said optical beam passes is out of focus in the optical system used to provide said optical beam.

2. The combination of claim 1, where said first and second sections have a similar configuration.

3. The combination of claim 1, where said floppy disk is a double-sided floppy disk.

4. The combination of claim 1, further including an annular peripheral groove in said peripheral support means and an annular central groove in said central support means, the plane of said floppy disk during rotation being within said peripheral groove and said central groove.

5. The combination of claim 1, further including a shoulder in said peripheral support means for supporting the outside diameter of said floppy disk when said disk and housing are at rest.

6. The combination of claim 1, where said housing is generally annular in shape and is comprised of a flexible material of sufficient thinness that it will distort during rotation.

7. The combination of claim 1, where said central hub portion includes an opening extending axially therethrough and said drive means includes a spindle extending through said opening, said spindle being rotated to impart a rotary motion to the combination of said housing and said floppy disk.

8. The combination of claim 1, where said first and second sections are brought together and secured to one another, said floppy disk being held by said joined first and second sections.

9. The combination of claim 1, where said disk has calendared grooves thereon.

10. The combination of claim 1, where said protective housing is comprised of a lightweight polymer material.

* * * * *